(No Model.)
J. K. MILLER.
ROPE OR TWINE HOOK.
No. 436,252.   Patented Sept. 9, 1890.
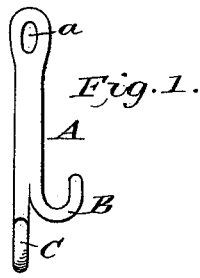
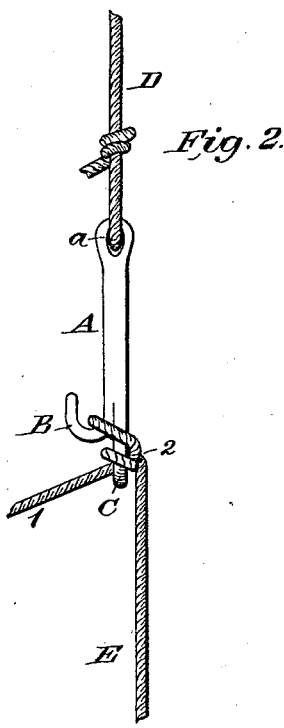
WITNESSES:
Fred G. Dieterich
Chas. R. Wright
INVENTOR:
J. K. Miller
BY Munn & Co.
ATTORNEYS

UNITED STATES PATENT OFFICE.

JAMES K. MILLER, OF EMPORIA, KANSAS.

ROPE OR TWINE HOOK.

SPECIFICATION forming part of Letters Patent No. 436,252, dated September 9, 1890.

Application filed January 13, 1890. Serial No. 336,818. (No model.)

*To all whom it may concern:*

Be it known that I, JAMES K. MILLER, of Emporia, in the county of Lyon and State of Kansas, have invented a new and Improved Rope or Twine Hook, of which the following is a full, clear, and exact description.

My invention relates to improvements in hooks for fastening ropes or twines; and the object of my invention is to provide a hook, by means of which ropes in use with pulley-blocks or carrying-weights may be quickly and securely fastened or released, and by means of which the weight or load may be gradually lowered, and to provide a hook which may also be used for fastening bag-strings and for analogous purposes.

To this end my invention consists in the combination of two hooks and a shank having an eye in the upper end thereof, to which a rope may be attached, the hooks projecting from the shank at right angles with each other and one of the hooks being higher up on the shank than the other.

Reference is to be had to the accompanying drawings, forming a part of this specification, in which similar letters and figures of reference indicate corresponding parts in both views.

Figure 1 is a front elevation of the hook with the ropes removed, the hooks being at right angles one to the other; and Fig. 2 is a rear elevation with the ropes attached thereto.

The hook consists of a shank A, having an eye $a$ in the upper end thereof, by which it is suspended by a rope D and two projecting hooks B and C, arranged at right angles upon the shank A, with the hook B above the hook C.

The hook being suspended as shown, the rope E, which sustains a weight, is attached thereto as follows: The rope E is brought up back of the bow and along the side of the projecting shank of the hook C and passed into the hook B. The free end of the rope is then wound one or more times around the shank and bow of the hook C below the hook B, so that when weight is applied to the rope E it will press the coil 2 upon the hook C and be prevented from slipping. It will thus be seen that when the weight or strain is upon the rope E, as shown in Fig. 2, the greater the weight upon the rope E the more securely will it be held. To release the rope or lower a load, the free end is unwound from the shank of the hook, and the rope may be allowed to slip through the hooks at any desired rate of speed.

From the foregoing description it will be seen that the hook may be used for fastening almost any kind of a bundle or bale, and may be used for hoisting purposes as well.

I have described a certain method of fastening a rope or cord in the hooks; but I do not confine myself to any particular method of fastening, as it is evident that it may be done in many ways.

Having thus described my invention, what I claim as new, and desire to secure by Letters Patent, is—

A hook consisting, essentially, of the combination of two hooks, with a shank having an eye in the end thereof by which it may be secured in any desired position, the hooks being arranged at right angles with each other and at different heights upon the shank and adapted to receive and fasten a rope or twine, substantially as described.

JAMES K. MILLER.

Witnesses:
I. N. WELLS,
HENRY GIGER.